US011040831B2

(12) United States Patent
Davies

(10) Patent No.: US 11,040,831 B2
(45) Date of Patent: Jun. 22, 2021

(54) DUAL CONVEYOR SORTING SYSTEM

(71) Applicant: Setpoint Systems, Inc., Ogden, UT (US)

(72) Inventor: George Davies, Brigham City, UT (US)

(73) Assignee: Setpoint Systems, Inc., Ogden, UT (US)

( * ) Notice: Subject to any disclaimer, the term of this patent is extended or adjusted under 35 U.S.C. 154(b) by 0 days.

(21) Appl. No.: 16/671,026

(22) Filed: Oct. 31, 2019

(65) Prior Publication Data

US 2020/0130939 A1 Apr. 30, 2020

Related U.S. Application Data

(60) Provisional application No. 62/753,268, filed on Oct. 31, 2018.

(51) Int. Cl.
| | |
|---|---|
| *B65G 15/22* | (2006.01) |
| *B65G 27/04* | (2006.01) |
| *B65G 21/12* | (2006.01) |
| *B07C 3/08* | (2006.01) |
| *B07C 5/36* | (2006.01) |
| *B65G 15/12* | (2006.01) |

(52) U.S. Cl.
CPC ............ *B65G 15/22* (2013.01); *B07C 3/08* (2013.01); *B07C 5/36* (2013.01); *B65G 15/12* (2013.01); *B65G 21/12* (2013.01); *B65G 27/04* (2013.01); *B65G 2203/0233* (2013.01); *B65G 2203/0283* (2013.01); *B65G 2203/0291* (2013.01)

(58) Field of Classification Search
CPC .... B07C 5/02; B07C 3/08; B07C 1/04; B07C 5/36; B65G 2201/0285; B65G 2203/0233; B65G 2203/0283; B65G 2203/0291; B65G 47/22; B65G 21/12; B65G 47/1492; B65G 27/04; B65G 15/22; B65G 15/12; B65G 15/14; B65G 15/16
USPC .......................................................... 198/415
See application file for complete search history.

(56) References Cited

U.S. PATENT DOCUMENTS 4,557,341 A * 12/1985 Söderholm ............ G01G 11/04
 177/119
4,578,841 A * 4/1986 Nijhuis .................... A22B 3/06
 452/182

(Continued)

FOREIGN PATENT DOCUMENTS

FR 2725704 A1 * 4/1996 ............. B65G 15/12

OTHER PUBLICATIONS

Google Translate FR 2 725 704, Google 2020. (Year: 2020).*

*Primary Examiner* — Mark A Deuble
(74) *Attorney, Agent, or Firm* — Kunzler Bean & Adamson

(57) ABSTRACT

Apparatuses, systems, and methods are disclosed for a dual conveyor sorting system. An apparatus includes a first conveyor belt assembly that includes a first conveyor belt moving at a first rate in a first direction. An apparatus includes a second conveyor belt assembly that includes a second conveyor belt moving at a second rate in a second direction. The first rate is faster than the second rate and the first direction is the same as the second direction. The first conveyor belt assembly is positioned along a first axis perpendicular to the second conveyor belt assembly positioned along a second axis. A first edge of the first conveyor belt assembly is positioned substantially adjacent to a first edge of the second conveyor belt assembly.

18 Claims, 4 Drawing Sheets

(56) References Cited

U.S. PATENT DOCUMENTS

| | | | | |
|---|---|---|---|---|
| 4,720,005 | A * | 1/1988 | Beresinsky | B65G 15/12 |
| | | | | 198/359 |
| 5,150,307 | A * | 9/1992 | McCourt | B07C 5/365 |
| | | | | 700/223 |
| 5,201,398 | A * | 4/1993 | Clugston | B65G 47/14 |
| | | | | 198/394 |
| 7,793,773 | B2 * | 9/2010 | Beck | B65G 47/2445 |
| | | | | 198/584 |
| 8,061,503 | B2 * | 11/2011 | Ancarani | B65G 47/2445 |
| | | | | 198/398 |
| 9,132,971 | B2 * | 9/2015 | Overly | B65G 47/30 |
| 2003/0141165 | A1 * | 7/2003 | Reznik | B65G 47/30 |
| | | | | 198/434 |
| 2004/0144618 | A1 * | 7/2004 | McDonald | B65G 47/256 |
| | | | | 198/389 |
| 2007/0080045 | A1 * | 4/2007 | Lutz | B65G 37/005 |
| | | | | 198/373 |
| 2018/0081346 | A1 * | 3/2018 | Dwivedi | G05B 19/41865 |
| 2018/0148271 | A1 * | 5/2018 | Svenningsen | B65G 47/2445 |

* cited by examiner

DUAL CONVEYOR SORTING SYSTEM

CROSS-REFERENCES TO RELATED APPLICATIONS

This application claims the benefit of U.S. Provisional Patent Application No. 62/753,268 entitled "DUAL CONVEYOR SORTING SYSTEM" and filed on Oct. 31, 2018, for George Davies, which is incorporated herein by reference.

FIELD

This invention relates to conveyor systems and more particularly relates to dual conveyor sorting systems.

BACKGROUND

Sorting, de-stacking, or otherwise rearranging objects as they move along conveyor belts can be useful for moving objects along in a warehouse, assembly line, package processing, or the like. Often, this is handled manually, which can be time consuming and expensive because it can require additional employees to manually de-stack the objects on the conveyor belts.

SUMMARY

An apparatus for a dual conveyor sorting system is disclosed. A system and method also perform the functions of the apparatus. An apparatus, in one embodiment, includes a first conveyor belt assembly that includes a first conveyor belt moving at a first rate in a first direction. An apparatus, in certain embodiments, includes a second conveyor belt assembly that includes a second conveyor belt moving at a second rate in a second direction. The first rate may be faster than the second rate and the first direction may be the same as the second direction. The first conveyor belt assembly may be positioned along a first axis perpendicular to the second conveyor belt assembly positioned along a second axis. A first edge of the first conveyor belt assembly may be positioned substantially adjacent to a first edge of the second conveyor belt assembly.

In one embodiment, an inner angle between the first conveyor belt assembly and the second conveyor belt assembly is between 85 and 95 degrees. In certain embodiments, the inner angle between first conveyor belt assembly and the second conveyor belt assembly is 90 degrees.

In one embodiment, the first conveyor belt assembly is positioned in a substantially vertical orientation along the first axis such that the first direction is along a third axis perpendicular to the first and second axes. In some embodiments, the second conveyor belt assembly is positioned in a substantially horizontal orientation along the second axis such that the first direction is along a third axis perpendicular to the first and second axes.

In one embodiment, the first and second conveyor belt assemblies are each positioned between 40 and 50 degrees above a horizontal plane along the first and second axes. In some embodiments, the first and second conveyor belt assemblies are each positioned 45 degrees above the horizontal plane along the first and second axes.

In one embodiment, the first and second conveyor belt assemblies are situated a distance above a horizontal plane at a first end along a third axis such that the first and second conveyor belt assemblies are inclined above the horizontal plane. In certain embodiments, the first and second directions of the first and second conveyor belts along the third axis is in a direction upward of the incline above the horizontal plane.

In one embodiment, the first and second conveyor belt assemblies are configured to vibrate at a variable rate. In certain embodiments, the apparatus includes a sensor system configured to detect a status of objects moving along the first and second conveyor belts along the third axis. The sensor system may adjust one or more of a speed, a direction, and an angle of one or more of the first and second conveyor belt assemblies based on the detected status.

In further embodiments, the detected status indicates that objects moving along the first and second conveyor belts are in an incorrect order. The sensor system may adjust one or more of a speed, a direction, and an angle of one or more of the first and second conveyor belt assemblies so that the objects are ordered correctly. In certain embodiments, the detected status indicates that objects on the first and second conveyor belts are obstructed from moving. The sensor system may adjust one or more of a speed, a direction, and an angle of one or more of the first and second conveyor belt assemblies to clear the obstruction.

In one embodiment, the detected status indicates that objects on the first and second conveyor belts are oriented incorrectly. The sensor system may adjust one or more of a speed, a direction, and an angle of one or more of the first and second conveyor belt assemblies to correctly orient the objects. In further embodiments, the apparatus includes one or more flexibly rigid objects positioned above one or more of the first and second conveyor belts to de-stack objects stacked on the one or more of the first and second conveyor belts.

A system, in one embodiment, includes a plurality of apparatuses. An apparatus, in one embodiment, includes a first conveyor belt assembly that includes a first conveyor belt moving at a first rate in a first direction. An apparatus, in certain embodiments, includes a second conveyor belt assembly that includes a second conveyor belt moving at a second rate in a second direction. The first rate may be faster than the second rate and the first direction may be the same as the second direction. The first conveyor belt assembly may be positioned along a first axis perpendicular to the second conveyor belt assembly positioned along a second axis. A first edge of the first conveyor belt assembly may be positioned substantially adjacent to a first edge of the second conveyor belt assembly. In one embodiment, an apparatus of the plurality of apparatuses is positioned adjacent to and overlapping a subsequent apparatus of the plurality of apparatuses along a third axis so that objects moving on the apparatus along the third axis fall onto the subsequent apparatus.

In one embodiment, an inner angle between the first conveyor belt assembly and the second conveyor belt assembly of each of the plurality of apparatuses is between 85 and 95 degrees. In certain embodiments, the first and second conveyor belt assemblies of each of the plurality of apparatuses are each positioned between 40 and 50 degrees above a horizontal plane along the first and second axes. In further embodiments, the first and second directions along the third axis of the first and second conveyor belts of each of the plurality of apparatuses is in a direction upward of the incline above the horizontal plane.

A method, in one embodiment, includes moving a first conveyor belt of a first conveyor belt assembly at a first rate in a first direction. A method, in certain embodiments, includes moving a second conveyor belt of a second conveyor belt assembly at a second rate in a second direction.

The first rate may be faster than the second rate and the first direction may be the same as the second direction. In one embodiment, the first conveyor belt assembly is positioned along a first axis perpendicular to the second conveyor belt assembly positioned along a second axis. A first edge of the first conveyor belt assembly may be positioned substantially adjacent to a first edge of the second conveyor belt assembly.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
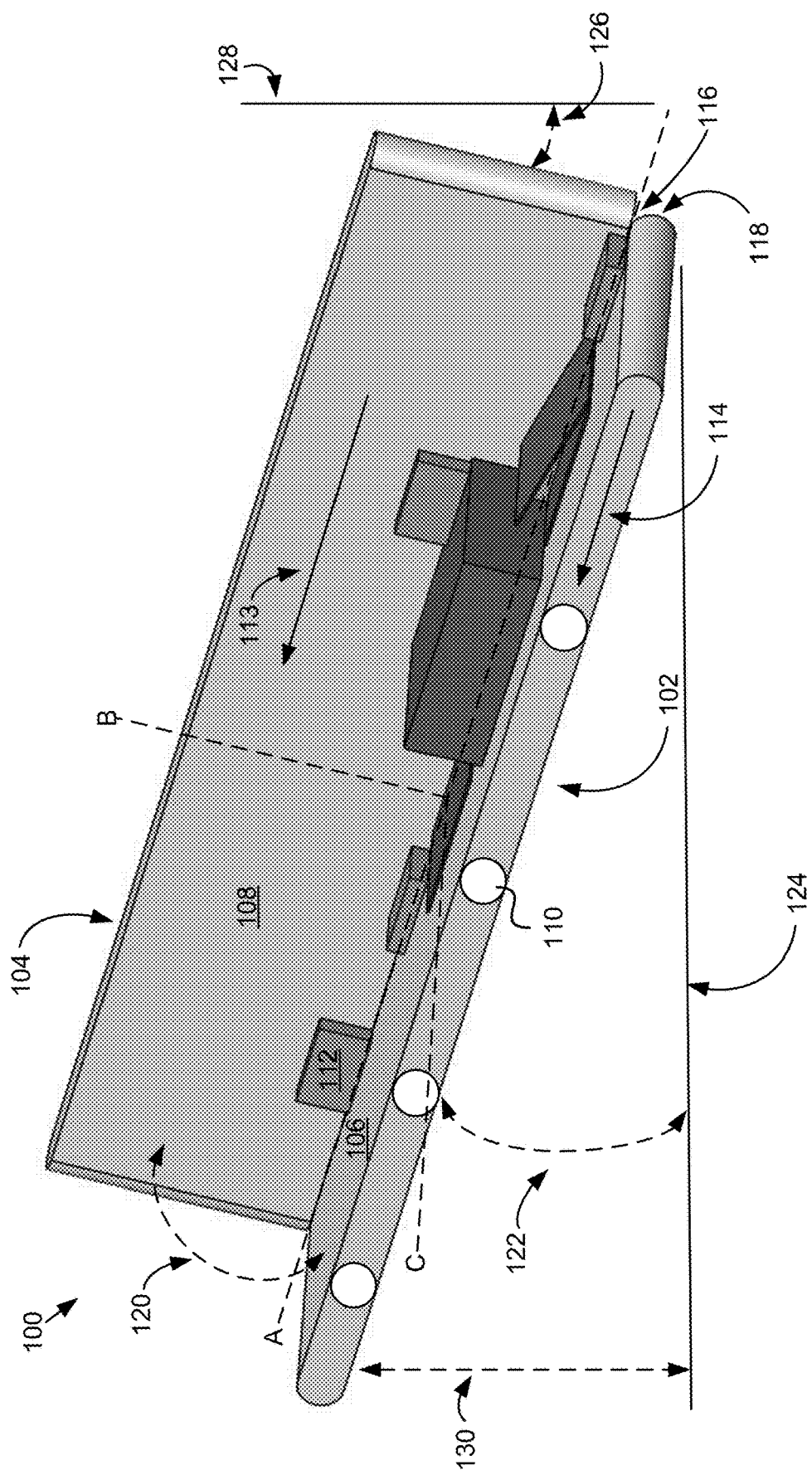
FIG. 1 is a perspective view illustrating one embodiment of an apparatus for a dual conveyor sorting system.

FIG. 1 depicts one embodiment of a system 100 for a dual conveyor sorting system. In one embodiment, the system 100 includes a first conveyor belt assembly 102 and a second conveyor belt assembly 104. As shown in FIG. 1, the first conveyor belt assembly 102 is located along axis C substantially perpendicular to the second conveyor belt assembly 104, which is located along axis B. Furthermore, the first conveyor belt assembly 102 is located adjacent to the second conveyor belt assembly 104 at a first edge 116, 118 of each conveyor belt assembly 102, 104. In some embodiments, the first conveyor belt assembly 102 is positioned in a substantially horizontal position, and the second conveyor belt assembly 104 is positioned in a substantially vertical position relative to a vertical plane 128, offset by an angle 126 from the vertical plane 128. In certain embodiments, the inner angle 120 between the first conveyor belt assembly 102 and the second conveyor belt assembly 104 is between 85 and 95 degrees, and in further embodiments the inner angle is 90 degrees.

In some embodiments, the first conveyor belt assembly 102 and the second conveyor belt assembly 104 are each positioned at an angle 122 above a horizontal plane 124. For example, the first and second conveyor belt assemblies 102, 104 may be positions at an angle 122 between 40 and 50 degrees above the horizontal plane 124 along axes B and C, and in further embodiments the first conveyor belt assembly 102 and the second conveyor belt assembly 104 are each positioned at 45 degrees above the horizontal plane along axes B and C.

In some embodiments, the first conveyor belt assembly 102 and the second conveyor belt assembly 104 are situated at one end a certain distance 130 above the horizontal plane along axis A such that one end of each of the conveyor belt assemblies 102, 104 are higher than the opposite end of the conveyor belt assemblies 102, 104 to create an incline. For instance, the left ends of the first and second conveyor belt assemblies 102, 104 may be raised or set at an incline/decline relative to the right end of the first and second conveyor belt assemblies 102, 104.

In one embodiment, the first and second conveyor belts 106, 108 of the first and second conveyor belt assemblies 102, 104 move in the same directions 113, 114 along the third axis A. In one embodiment, the first and second directions 113, 114 of the first and second conveyor belts 106, 108 move along the third axis A upward of the incline so that the objects 112 move upward along the third axis A.

Each conveyor belt assembly 102, 104, in one embodiment, includes a conveyor belt 106, 108 that is moved circularly by motors (e.g., servo motors, DC motors, DC stepper motor, or the like) over a plurality of rollers 110. In one embodiment, the first and second conveyor belt assemblies 106, 108 are comprised of various materials such as rubber, plastic, or the like and may include bumps, ridges, and/or other textures that help grab and move objects 112 along the conveyor belts 106, 108.

In one embodiment, the second conveyor belt 108 moves at a faster rate or speed relative to the rate or speed of the first conveyor belt 106, which may create a stirring effect for the objects moving along the conveyor belts 106, 108. For instance, the second conveyor belt 108 may move at double or triple the rate/speed of the first conveyor belt 106. In certain embodiments, the first conveyor belt 106 moves at a faster rate than the second conveyor belt 108. Either way, in this manner, objects 112 (such as packages) that are placed on the first conveyor belt 106 may be unstacked if the packages are stacked on one another, may be unjammed if there is an obstruction on the first conveyor belt 106, may be positioned in a different or correct orientation (e.g., with the long side of a package oriented against the second conveyor belt 108), may be placed in a certain order (e.g., bigger to smaller sized packages), and/or the like.

In one embodiment, the system 100 may include a sensor system (not shown) that uses one or more sensors (e.g., cameras, pressure sensors, force sensors, proximity sensors, and/or the like) to detect the status of the objects moving by the conveyor belts 106, 108. For example, the sensor system may detect that packages are stacked, that packages are obstructed or no longer moving, that packages are not oriented corrected, that packages are in an incorrect order, and/or the like.

Based on input from the sensor system, the current states of the conveyor belts 106, 108 may be adjusted on the fly, dynamically, or the like. For example, a controller for the first and/or second conveyor belt assemblies 102, 104 may automatically various settings for the conveyor belt assemblies 102, 104. For instance, the controller may adjust the speeds or rates of the conveyor belts 106, 108 (e.g., made faster, made slower, made consistent, or the like); may adjust the angles of the conveyor belt assemblies 102, 104 in relation to a horizontal plane 124; may adjust the direction of movement of the conveyor belts 106, 108; may adjust the incline of the conveyor belt assemblies 102, 104 relative to the horizontal plane 124; and/or the like.

In one embodiment, the system 100 may include one or more flexibly rigid objects that are positioned above a conveyor belt assembly 102, 104 to help unstack objects 112 that are stacked on one another. The flexibly rigid objects may include plastic strips, chains, ropes, and/or the like. In further embodiments, the first and/or second conveyor belt assemblies 102, 104 are configured to vibrate, rattle, shake, or the like at variable rates to help separate or move objects 112 along the conveyor belts 106, 108.

Figure 2:
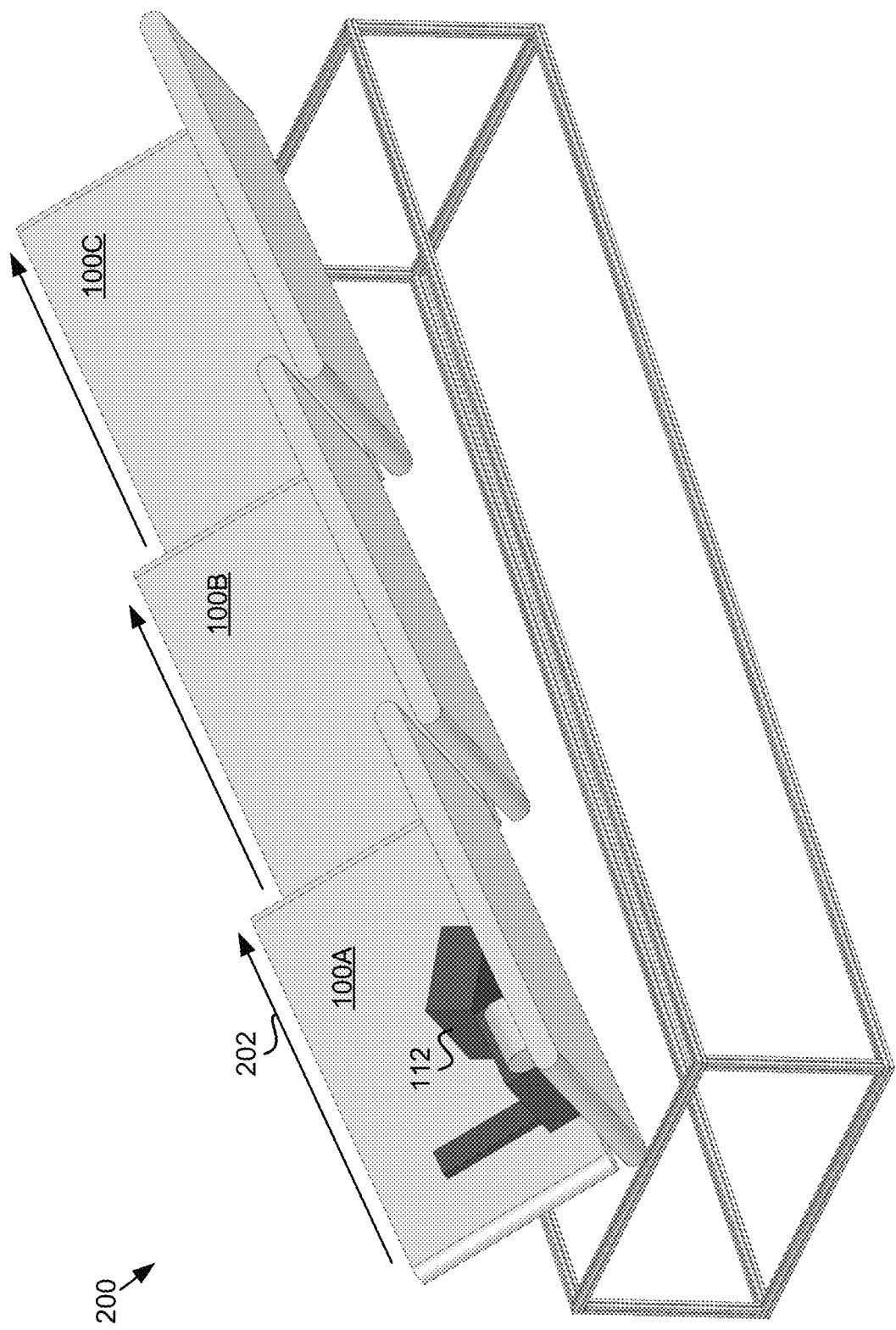
FIG. 2 is a perspective view illustrating one embodiment of a system for a dual conveyor sorting system.

FIG. 2 depicts one embodiment of a system 200 for organizing objects. In one embodiment, the system 200 includes a plurality of dual conveyor assembly systems 100A-C (collectively 100). The plurality of dual conveyor assembly systems 100 may be positioned such that each dual conveyor assembly system 100 is located adjacent to another dual conveyor assembly system 100 and overlapping an adjacent dual conveyor assembly system 100. In such an embodiment, the dual conveyor assembly systems 100 may be configured to move 202 objects towards an adjacent dual conveyor assembly system 100 that it overlaps (e.g., like a waterfall), e.g., upward along the incline, to help unstack objects 112, orient objects 112, move objects 112, and/or the like as they move along the conveyor assembly systems 100.

In one embodiment, if a first conveyor belt 106 of a conveyor assembly system 100A moves at a first rate and a second conveyor belt 108 of the conveyor assembly system 100A moves at a second rate, the first conveyor belt 106 of an adjacent conveyor belt assembly 100B may move at the second rate and the second conveyor belt 108 of the adjacent conveyor belt assembly 100B may move at the first rate, and so on such that the conveyor belts of each conveyor belt assembly alternate the rates at which they move.

Figure 3:
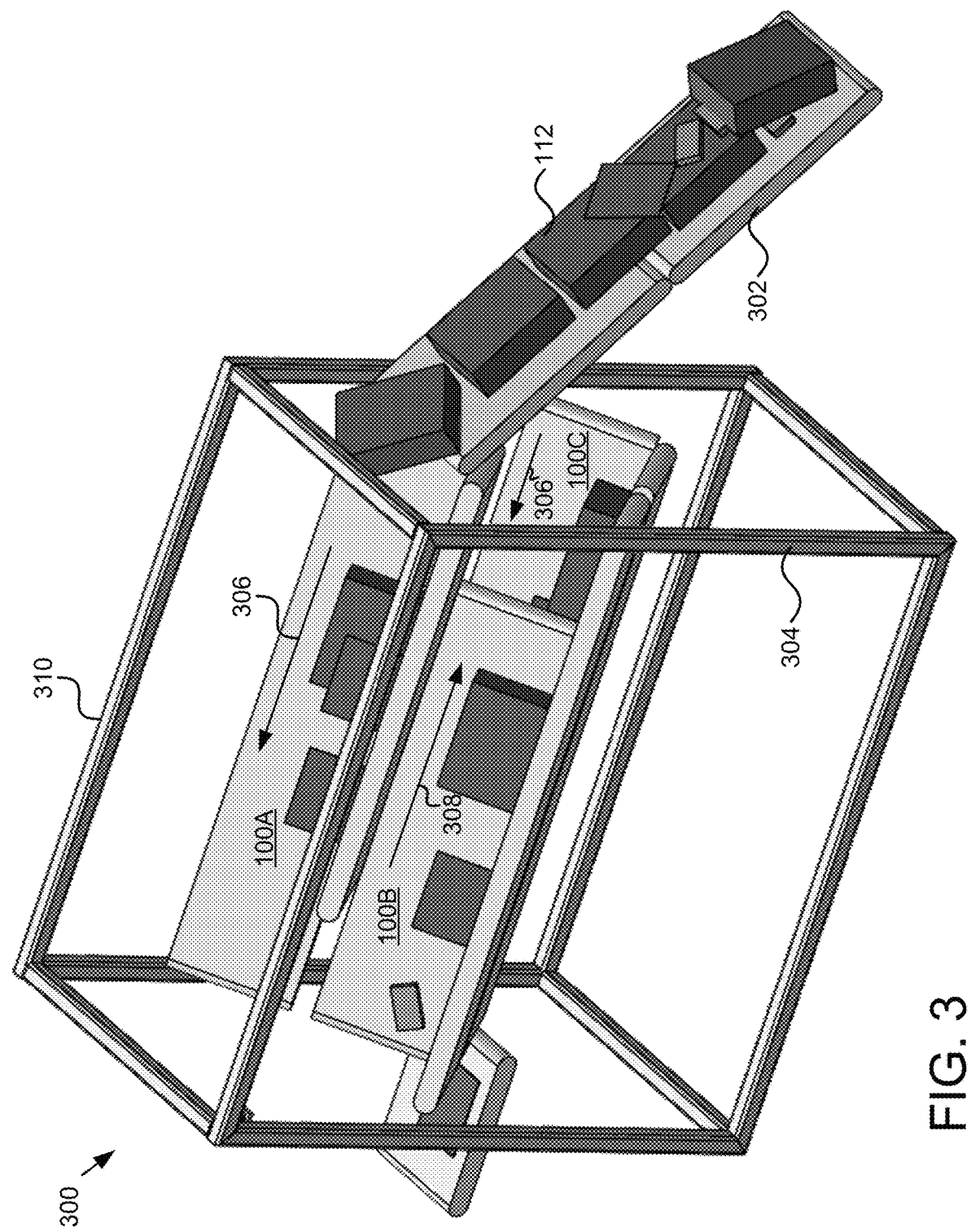
FIG. 3 is a perspective view illustrating one embodiment of a system for a dual conveyor sorting system.

FIG. 3 depicts one embodiment of another system 300 for organizing objects. In one embodiment, the system 300 includes a plurality of dual conveyor assembly systems 100A-C (collectively 100) and a riser conveyor assembly 302. Objects 112 placed on the riser conveyor assembly 302 are directed to a first dual conveyor assembly system 100A moving in a first direction 306. The objects 112 then fall to a second dual conveyor assembly system 100B moving in a second direction 308, and then fall to a third dual conveyor assembly system 100C moving in the first direction 306 again, and then off the system 300. In such an embodiment, the combination of stirring motion of the dual conveyor assembly systems 100 and the falling of the objects 112 provides separation, unstacking, orientation, positioning, and the like of the objects 112 as they move through the system 300.

In one embodiment, the system 300, not including the riser conveyor assembly 302, may be modular and may be coupled to a rack 310 so that the system 300 can be moved and installed where needed and may be coupled in series to multiple different systems 300, as needed, to facilitate object de-stacking, organizing, orientation, and/or the like.

Figure 4:
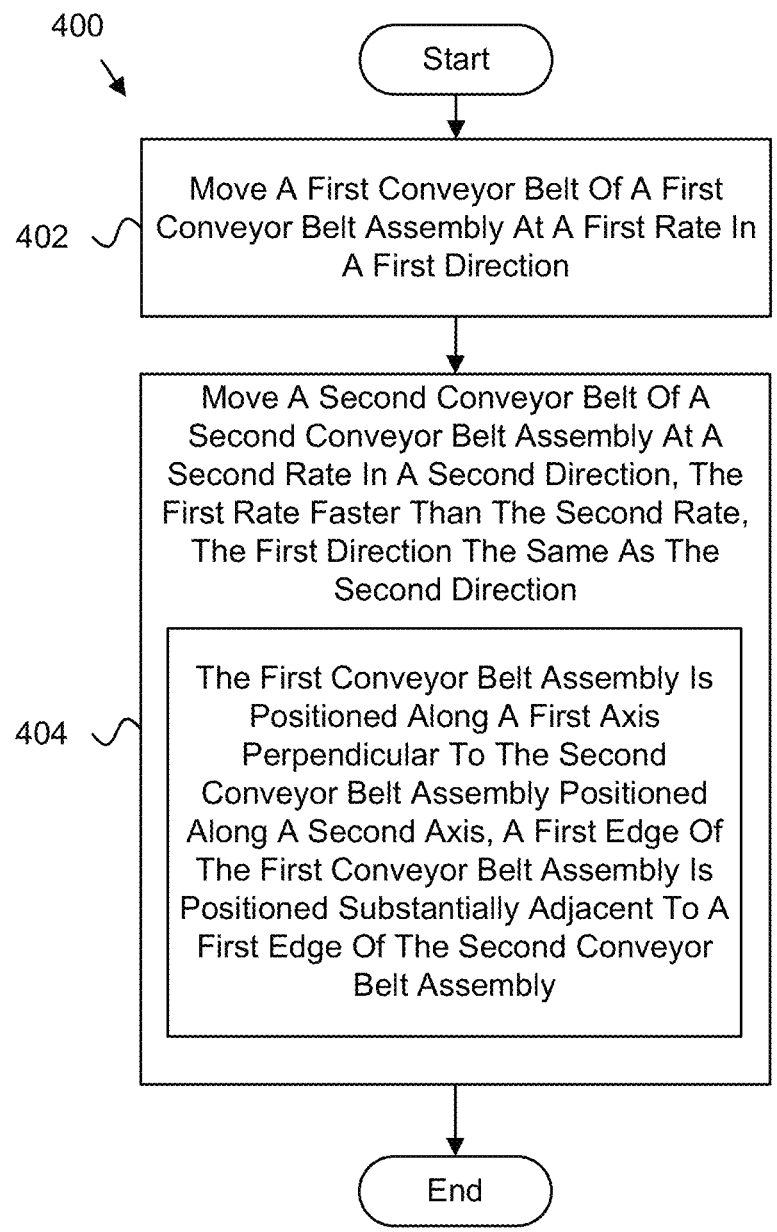
FIG. 4 is a schematic flow-chart diagram illustrating one embodiment of a method for a dual conveyor sorting system.

FIG. 4 depicts a schematic flow-chart diagram of one embodiment of a method 400 for organizing objects. In one embodiment, the method 400 begins and moves 402 a first conveyor belt 106 of a first conveyor belt assembly 102 at a first rate in a first direction 114. In further embodiments, the method 400 moves 404 a second conveyor belt 108 of a second conveyor belt assembly 104 at a second rate in a second direction 113, and the method 400 ends. The first rate may be faster than the second rate and the first direction 114 may be the same as the second direction 113. In one embodiment, the first conveyor belt assembly 102 is positioned along a first axis C perpendicular to the second conveyor belt assembly 104 positioned along a second axis B and a first edge 118 of the first conveyor belt assembly 102 is positioned substantially adjacent to a first edge 116 of the second conveyor belt assembly 104.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
    a first conveyor belt assembly comprising a first conveyor belt moving at a first rate in a first direction;
    a second conveyor belt assembly comprising a second conveyor belt moving at a second rate in a second direction, the first rate faster than the second rate, the first direction the same as the second direction, wherein the first conveyor belt assembly is positioned along a first axis perpendicular to the second conveyor belt assembly positioned along a second axis, a first edge of the first conveyor belt assembly positioned substantially adjacent to a first edge of the second conveyor belt assembly; and
    a sensor system configured to detect a status of objects moving along the first and second conveyor belts along a third axis, the sensor system adjusting one or more of a speed, a direction, and an angle of one or more of the first and second conveyor belt assemblies based on the detected status, the detected status indicating that objects moving along the first and second conveyor belts are in an incorrect order, the sensor system adjusting one or more of the speed, the direction, and the angle of one or more of the first and second conveyor belt assemblies so that the objects are ordered correctly.

2. The apparatus of claim 1, wherein an inner angle between the first conveyor belt assembly and the second conveyor belt assembly is between 85 and 95 degrees.

3. The apparatus of claim 2, wherein the inner angle between first conveyor belt assembly and the second conveyor belt assembly is 90 degrees.

4. The apparatus of claim 1, wherein the first conveyor belt assembly is positioned in a substantially vertical orientation along the first axis such that the first direction is along a third axis perpendicular to the first and second axes.

5. The apparatus of claim 1, wherein the second conveyor belt assembly is positioned in a substantially horizontal orientation along the second axis such that the first direction is along a third axis perpendicular to the first and second axes.

6. The apparatus of claim 1, wherein the first and second conveyor belt assemblies are each positioned between 40 and 50 degrees above a horizontal plane along the first and second axes.

7. The apparatus of claim 6, wherein the first and second conveyor belt assemblies are each positioned 45 degrees above the horizontal plane along the first and second axes.

8. The apparatus of claim 1, wherein the first and second conveyor belt assemblies are situated a distance above a horizontal plane at a first end along a third axis such that the first and second conveyor belt assemblies are inclined above the horizontal plane.

9. The apparatus of claim 1, wherein the first and second directions of the first and second conveyor belts along the third axis is in a direction upward of the incline above the horizontal plane.

10. The apparatus of claim 1, wherein the first and second conveyor belt assemblies are configured to vibrate at a variable rate.

11. The apparatus of claim 1, wherein the detected status indicates that objects on the first and second conveyor belts are obstructed from moving, the sensor system adjusting one or more of the speed, the direction, and the angle of one or more of the first and second conveyor belt assemblies to clear the obstruction.

12. The apparatus of claim 1, wherein the detected status indicates that objects on the first and second conveyor belts are oriented incorrectly, the sensor system adjusting one or more of a speed, a direction, and an angle of one or more of the first and second conveyor belt assemblies to correctly orient the objects.

13. The apparatus of claim 1, further comprising one or more flexibly rigid objects positioned above one or more of the first and second conveyor belts to de-stack objects stacked on the one or more of the first and second conveyor belts.

14. A system, comprising:
a plurality of apparatuses, each apparatus comprising:
a first conveyor belt assembly comprising a first conveyor belt moving at a first rate in a first direction; and
a second conveyor belt assembly comprising a second conveyor belt moving at a second rate in a second direction, the first rate faster than the second rate, the first direction the same as the second direction,
wherein the first conveyor belt assembly is positioned along a first axis perpendicular to the second conveyor belt assembly positioned along a second axis, a first edge of the first conveyor belt assembly positioned substantially adjacent to a first edge of the second conveyor belt assembly,
wherein an apparatus of the plurality of apparatuses is positioned adjacent to and overlapping a subsequent apparatus of the plurality of apparatuses along a third axis so that objects moving on the apparatus along the third axis fall onto the subsequent apparatus.

15. The system of claim 14, wherein an inner angle between the first conveyor belt assembly and the second conveyor belt assembly of each of the plurality of apparatuses is between 85 and 95 degrees.

16. The system of claim 14, wherein the first and second conveyor belt assemblies of each of the plurality of apparatuses are each positioned between 40 and 50 degrees above a horizontal plane along the first and second axes.

17. The system of claim 14, wherein the first and second directions along the third axis of the first and second conveyor belts of each of the plurality of apparatuses is in a direction upward of the incline above the horizontal plane.

18. A method, comprising:
moving a first conveyor belt of a first conveyor belt assembly at a first rate in a first direction;
moving a second conveyor belt of a second conveyor belt assembly at a second rate in a second direction, the first rate faster than the second rate, the first direction the same as the second direction, wherein the first conveyor belt assembly is positioned along a first axis perpendicular to the second conveyor belt assembly positioned along a second axis, a first edge of the first conveyor belt assembly positioned substantially adjacent to a first edge of the second conveyor belt assembly; and
detecting a status of objects moving along the first and second conveyor belts along a third axis, the sensor system adjusting one or more of a speed, a direction, and an angle of one or more of the first and second conveyor belt assemblies based on the detected status, the detected status indicating that objects moving along the first and second conveyor belts are in an incorrect order, the sensor system adjusting one or more of the speed, the direction, and the angle of one or more of the first and second conveyor belt assemblies so that the objects are ordered correctly.

* * * * *